(12) United States Patent
McGraw

(10) Patent No.: US 10,694,674 B2
(45) Date of Patent: Jun. 30, 2020

(54) DOWN CROP ATTACHMENT FOR A HEADER

(71) Applicant: CNH Industrial America LLC, New Holland, PA (US)

(72) Inventor: Nate McGraw, Macomb, IL (US)

(73) Assignee: CNH Industrial America LLC, New Holland, PA (US)

(*) Notice: Subject to any disclaimer, the term of this patent is extended or adjusted under 35 U.S.C. 154(b) by 164 days.

(21) Appl. No.: 15/882,445

(22) Filed: Jan. 29, 2018

(65) Prior Publication Data
US 2019/0230860 A1    Aug. 1, 2019

(51) Int. Cl.
| | |
|---|---|
| *A01D 57/01* | (2006.01) |
| *A01D 63/00* | (2006.01) |
| *A01D 57/22* | (2006.01) |
| *A01D 63/04* | (2006.01) |
| *A01D 45/02* | (2006.01) |

(52) U.S. Cl.
CPC .............. *A01D 57/01* (2013.01); *A01D 57/22* (2013.01); *A01D 63/00* (2013.01); *A01D 63/04* (2013.01); *A01D 45/021* (2013.01)

(58) Field of Classification Search
CPC ........ A01D 57/01; A01D 57/22; A01D 63/04; A01D 45/021; A01D 63/00; A01D 65/00; A01B 43/005
See application file for complete search history.

(56) References Cited

U.S. PATENT DOCUMENTS

| | | | | |
|---|---|---|---|---|
| 675,174 | A * | 5/1901 | Still | A01D 45/021 56/119 |
| 1,219,327 | A * | 3/1917 | Keeler | A01D 45/021 56/106 |
| 1,901,099 | A * | 3/1933 | Hale | A01D 45/02 56/102 |
| 2,618,111 | A * | 11/1952 | Egstad | A01B 43/005 171/65 |
| 3,331,196 | A | 7/1967 | Grant | |
| 3,584,444 | A * | 6/1971 | Sammann | A01D 45/021 56/119 |
| 3,646,737 | A | 3/1972 | Grant | |
| 4,137,695 | A * | 2/1979 | Sammann | A01D 65/00 56/106 |

(Continued)

FOREIGN PATENT DOCUMENTS

| | | | | |
|---|---|---|---|---|
| JP | 2014007977 A | * | 1/2014 | ............ A01D 25/00 |
| JP | 2016-67260 A | | 5/2016 | |

*Primary Examiner* — Arpad Fabian-Kovacs
(74) *Attorney, Agent, or Firm* — Peter Zacharias; Patrick Sheldrake

(57) ABSTRACT

An agricultural vehicle including a chassis and a header connected to the chassis. The header includes a frame, at least one crop divider connected to the frame and having a crop divider body with at least one opening therein, and at least one down crop gatherer rotatably mounted to the at least one crop divider and at least partially extending through the at least one opening of the crop divider body. The at least one down crop gatherer has a first rotational direction. The header also includes a drive unit rotatably mounted to the at least one crop divider and contacting the at least one down crop gatherer. The drive unit has a second rotational direction and is configured for contacting the field and driving the at least one down crop gatherer in its first rotational direction.

20 Claims, 2 Drawing Sheets

(56) References Cited

U.S. PATENT DOCUMENTS

| | | | | |
|---|---|---|---|---|
| 4,148,175 A | * | 4/1979 | Miller | A01D 57/22 |
| | | | | 56/13.7 |
| 4,154,047 A | * | 5/1979 | Quick | A01D 45/10 |
| | | | | 56/13.9 |
| 4,346,548 A | * | 8/1982 | Atkinson | A01D 45/021 |
| | | | | 56/119 |
| 4,429,516 A | * | 2/1984 | Erickson | A01D 57/22 |
| | | | | 56/119 |
| 4,476,667 A | * | 10/1984 | Moss | A01D 45/021 |
| | | | | 56/106 |
| 4,524,571 A | | 6/1985 | Mak et al. | |
| 4,567,717 A | * | 2/1986 | Manton | A01D 43/082 |
| | | | | 56/119 |
| 4,584,825 A | | 4/1986 | Atkinson | |
| 5,775,076 A | * | 7/1998 | Mossman | A01D 45/021 |
| | | | | 56/119 |
| 8,413,413 B2 | * | 4/2013 | Lohrentz | A01D 45/021 |
| | | | | 56/95 |
| 10,021,832 B2 | * | 7/2018 | Wenger | A01D 57/06 |
| 2017/0049056 A1 | | 2/2017 | Wenger | |
| 2017/0325403 A1 | * | 11/2017 | Dennis | A01D 57/12 |

* cited by examiner

DOWN CROP ATTACHMENT FOR A HEADER

FIELD OF THE INVENTION

The present invention pertains to headers for agricultural vehicles and, more specifically, to a down corn attachment for a header.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A corn header generally includes a conveyor, row units, and accompanying drive architecture to power the header. The conveyor is disposed aft of the row units and it may be in the form of a conveyor belt, an auger with a tubular shaft having left and right flighting, or a combination of both. The row units generally include snouts, gathering chains, and stalk rolls. The snouts are conically shaped to pass in between the rows of corn, defining a designated passageway in between the snouts for the rows of corn to travel therein. Each row unit also includes respective gear boxes to drive the gathering chains and stalk rolls. Generally, the respective gear boxes are all driven by a single rotating cross shaft, which in turn is operably driven by the power take off (PTO) of the agricultural vehicle. As the agricultural vehicle traverses the field, the corn stalks are pulled inwardly by the gathering chains and downwardly by the stalk rolls. This motion causes the ears of corn to contact the base of the header, and thereby the ears snap off their respective stalks. The gathering chains additionally help to move crop material inwardly towards the conveyor, which transports the ears of corn to the center of the header for entry into the feeder house. The stripped corn stalks are further pinched and crushed by the stalk rolls, in order to accelerate the decomposition process of the stalks. The header may also include chopping units that have reciprocating blades located beneath the stalk rolls to chop the stalks, leaves, and other debris (also known as material other than grain "MOG") to more easily incorporate the remaining residue in subsequent tillage practices.

Some corn headers may further include a down corn attachment located on each snout, e.g. hood, of the header in order to move fallen, downed, and/or lodged crop material from the snouts to the conveyor. A down corn attachment may include a rotating chain or belt located at the center of the snout to pull crop material toward the conveyor. Incorporating a down corn attachment can decrease economic loss, since the bent, fallen, and/or lodged crop material would not otherwise be gathered into the header. Additionally, the down corn attachment will increase efficiency as the operator does not need to stop the harvesting process to clean lodged crop material from the header as often. However, down corn attachments may be complex and cumbersome to maintain. Additionally, some down corn attachments can undesirably increase the overall weight of the header.

What is needed in the art is a cost effective and efficient down corn attachment which can efficiently gather down crop material.

SUMMARY OF THE INVENTION

In one exemplary embodiment formed in accordance with the present invention, there is provided a header with crop dividers, down crop gathering wheels rotatably attached to the crop dividers, and drive wheels rotatably attached to the crop dividers that respectively contact the field and the gathering wheels in order to gather down crop material such as bent, fallen, or lodged crop material into the header.

In another exemplary embodiment formed in accordance with the present invention, there is provided an agricultural vehicle including a chassis and a header connected to the chassis. The header is configured for traversing a field in a forward direction to harvest a crop material. The header includes a frame, at least one crop divider connected to the frame and having a crop divider body with at least one opening therein, and at least one down crop gatherer rotatably mounted to the at least one crop divider and at least partially extending through the at least one opening of the crop divider body. The at least one down crop gatherer has a first rotational direction. The header also includes a drive unit rotatably mounted to the at least one crop divider and contacting the at least one down crop gatherer. The drive unit has a second rotational direction and is configured for contacting the field and driving the at least one down crop gatherer in its first rotational direction.

In yet another exemplary embodiment formed in accordance with the present invention, there is provided a header for an agricultural vehicle traversing a field in a forward direction to harvest a crop material. The header includes a frame, at least one crop divider connected to the frame and having a crop divider body with at least one opening therein, and at least one down crop gatherer rotatably mounted to the at least one crop divider and at least partially extending through the at least one opening of the crop divider body. The at least one down crop gatherer has a first rotational direction. The header also includes a drive unit rotatably mounted to the at least one crop divider and contacting the at least one down crop gatherer. The drive unit has a second rotational direction and is configured for contacting the field and driving the at least one down crop gatherer in its first rotational direction.

In yet another exemplary embodiment formed in accordance with the present invention, there is provided a method for operating an agricultural vehicle. The method includes the step of providing a header for traversing a field. The header includes a frame, at least one crop divider connected to the frame and having a crop divider body with at least one opening therein, and at least one down crop gatherer rotatably mounted to the at least one crop divider and at least partially extending through the at least one opening of the crop divider body. The at least one down crop gatherer has a first rotational direction. The header also includes a drive unit rotatably mounted to the at least one crop divider and contacting the at least one down crop gatherer. The drive unit has a second rotational direction and is configured for contacting the field and driving the at least one down crop gatherer in its first rotational direction. The method also includes the steps of rotating the drive unit in the second rotational direction by moving the header in a forward direction, driving the at least one down crop gatherer by translating a rotational movement of the drive unit to rotate the at least one down crop gatherer in the first rotational direction, and gathering a down crop material from the at least one crop divider toward a rear of the header by the down crop gatherer.

One possible advantage of the exemplary embodiment of the header is that the down crop gatherer can be efficiently driven without significantly increasing the overall weight of the header.

Another possible advantage of the exemplary embodiment of the header is that the header can be selectively configured to gather or not gather down crop material depending upon operational conditions because the down crop attachment may be removably coupled to the header.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
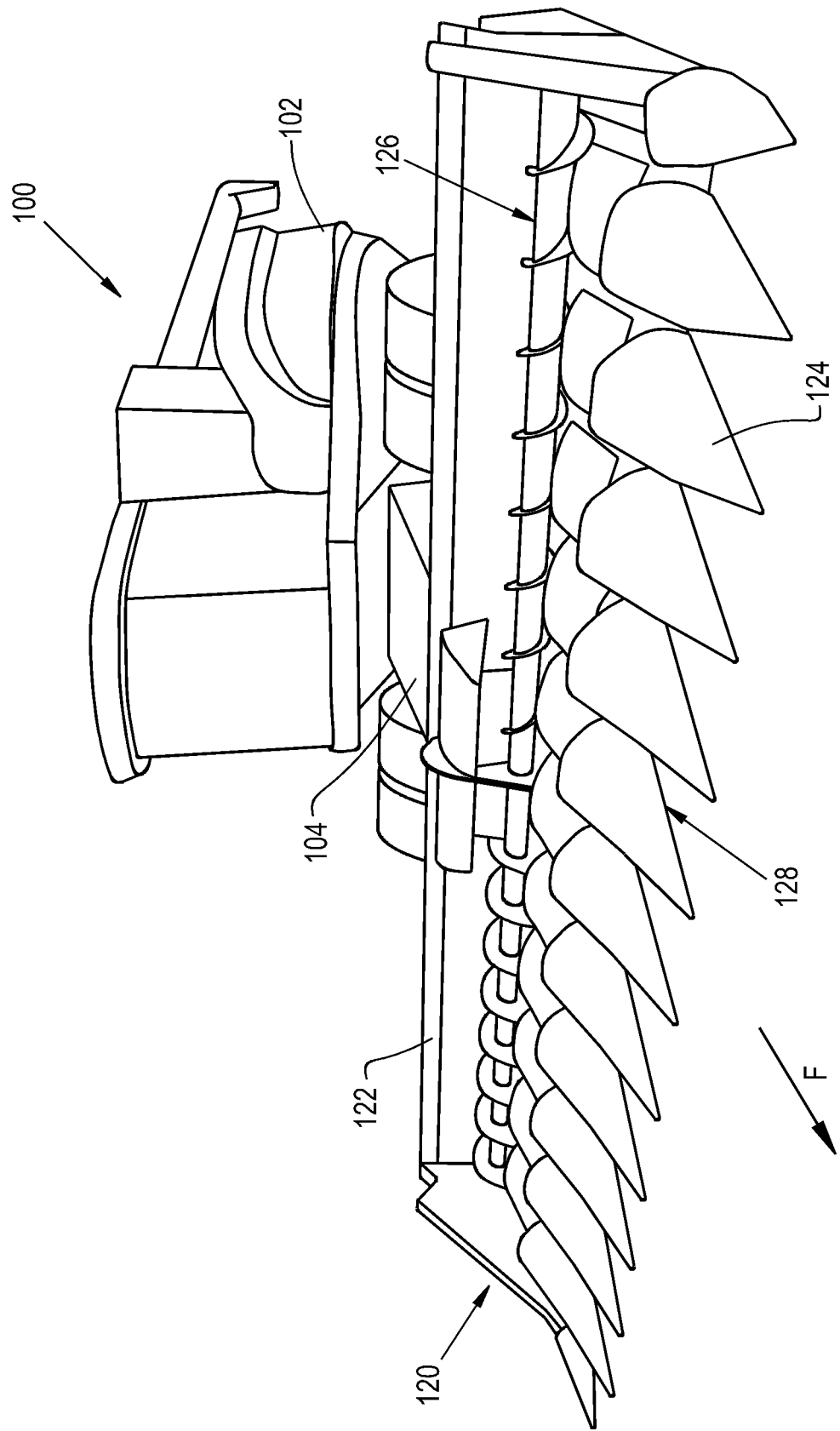
FIG. 1 illustrates a perspective view of a known agricultural vehicle with a conventional corn header.

Referring now to the drawings, and more particularly to FIG. 1, there is shown a conventional agricultural vehicle 100 in the form of a combine harvester 100 which generally includes a chassis 102, a feeder house 104, and a corn header 120 carried by the chassis 102. The corn header 120 includes a frame 122, crop dividers, e.g. hoods or snouts 124, a conveyor 126 such as an auger 126, and row units 128. The crop dividers 124 in part define a crop receiving slot or gap therebetween. Each row unit 128 may include one crop divider 124, a pair of gathering chains, and/or a pair of stalk rolls. The gathering chains and stalk rolls may be driven by respective gearboxes coupled to a single rotating cross shaft which is operably coupled to the PTO of the agricultural vehicle 100. The corn header 120 may also include choppers located underneath the stalk rolls of each row unit 128 that are driven by an additional rotating cross shaft. The cross shafts may in turn be driven by the PTO of the agricultural vehicle 100 via respective drivelines. As the agricultural vehicle 100 traverses a field in a forward direction, denoted by arrow "F", the standing corn stalks are cut from the field and the ears of corn are stripped from the stalks by the motion of the gathering chains and stalk rolls. The ears of corn are then gathered by the conveyor 126 and are transported to the center of the header 120 for entry into the feeder house 104 and subsequent downstream processing through the agricultural vehicle 100. The stalks and the remaining MOG are pulled down by the stalk rolls and may be chopped into smaller pieces by the chopper.

Figure 2:
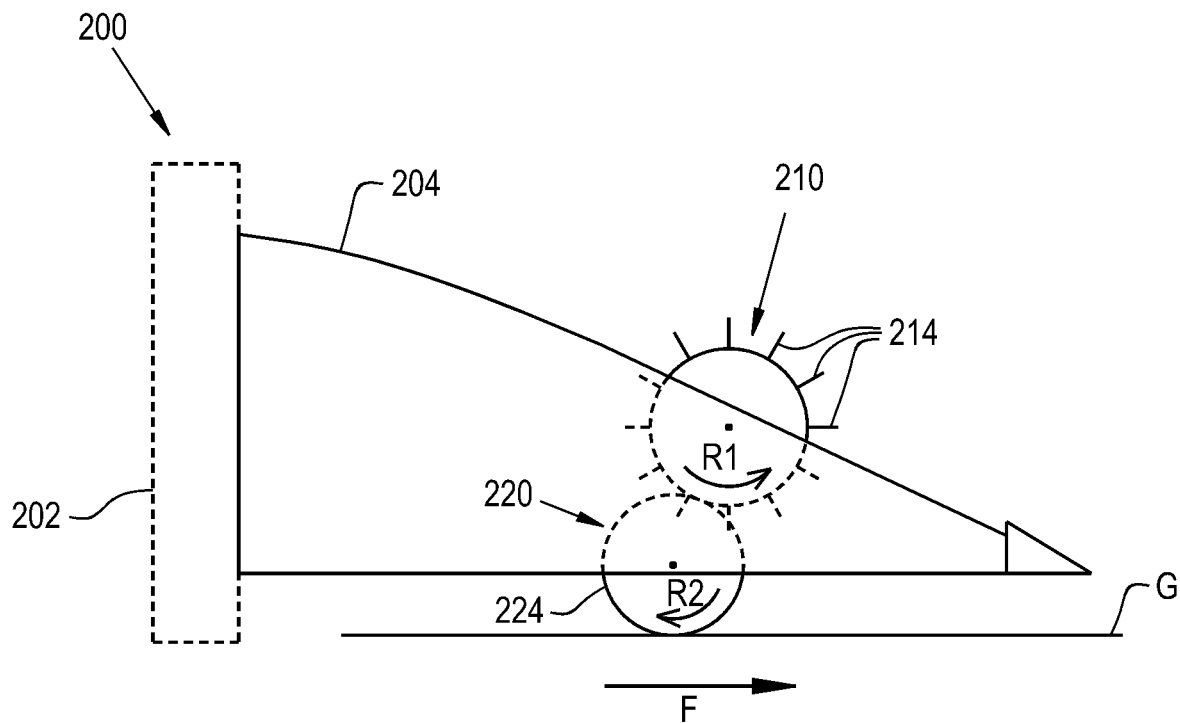
FIG. 2 illustrates a side view of a header including a down crop gatherer and a driving wheel for driving the down crop gatherer according to an exemplary embodiment of the present invention.
Figure 3:
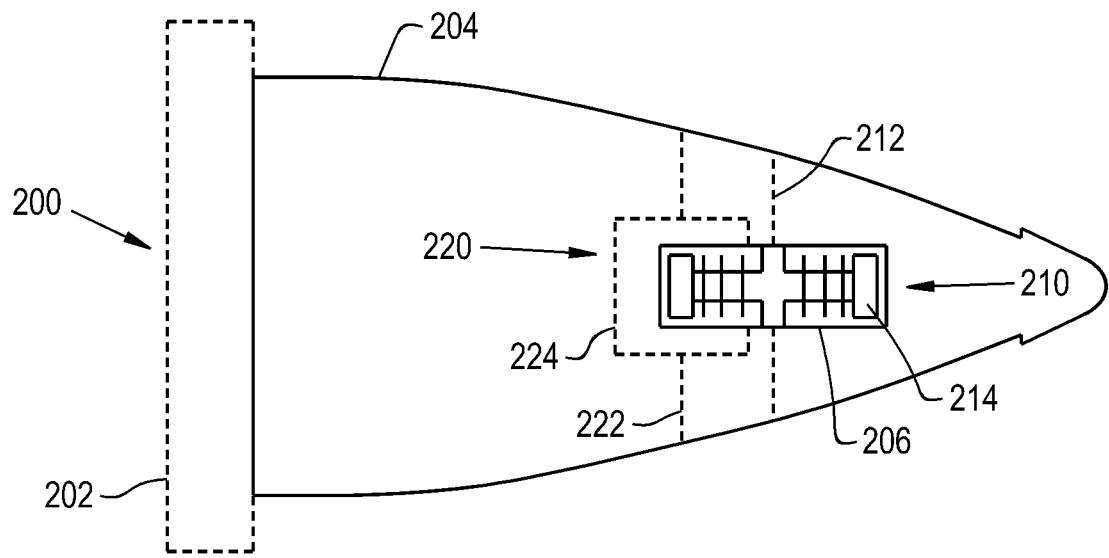
FIG. 3 illustrates a top view of the header as shown in FIG. 2 according to an exemplary embodiment of the present invention.

Referring now to FIGS. 2-3, there is shown a header 200 according to an exemplary embodiment of the present invention. The header 200 may be in the form of any desired header, such as a grain header or a corn header. The header 200 may be attached to the chassis 102 of the combine 100, as discussed above. The header 200 traverses a field, denoted by ground "G", in the forward direction F to harvest a crop material. As shown, the header 200 is in the form of a corn header 200 which generally includes a frame 202, one or more crop divider(s) 204 connected to the frame 202, one or more row unit(s) as discussed above which are connected to the frame 202, at least one down crop gatherer 210, and one or more drive unit(s) 220 for driving the down crop gatherer(s) 210.

The crop dividers 204 may be in the form of row dividers, defining crop receiving gaps therebetween, and/or end dividers, positioned at the lateral ends of the header 200. By way of example only, the crop divers 204 are shown and discussed as row dividers, such as snouts or hoods 204 attached to the frame 202 of the corn header 200. If the header 200 is configured as a grain header then the header 200 would include a cutter bar instead of row units, and the crop dividers 204 would be in the form of end dividers located at each lateral end of the grain header (not shown).

Each hood 204 has a hood body with at least one opening 206 therein for accommodating the down crop gatherer 210 (FIG. 3). The shape of each hood 204 may be conical such that the hood body defines an interior space which at least partially houses a down crop gatherer 210, and drive unit 220. The opening(s) 206 may be in the form of one or multiple cutout(s) 206, which can be formed during the fabrication of the hood 204, or cut out of the hood 204 post-fabrication. The hood 204 may be composed of any desirable material such as plastic or metal.

The at least one down crop gatherer 210 is rotatably mounted to the hood 204, and the down crop gatherer 210 rotates in a rotational direction R1 (FIG. 2). The header 200 may also include a gatherer shaft 212 to which the down crop gatherer 210 is attached. The gatherer shaft 212 may be coupled to the inner surface of the hood 204 by mounting brackets (FIG. 3). The down crop gatherer 210 extends through the opening 206 of the hood body. The down crop gatherer 210 may be in the form of a gathering wheel 210 which rotates in the rotational direction R1. The protuberances 214 can be in the form of ribs, fingers, flaps, spikes, and/or nodules. As shown, the protuberances 214 are in the form of deformable flaps 214, that contact down crop material. The deformable flaps 214 may extend outwardly from the gathering wheel 210. The deformable flaps 214 may also extend across a portion of the width, the full width, or beyond the width of the gathering wheel 210. The deformable flaps 214 may be composed of a plastic material and/or a rubber material which is rigid enough to move the bent, fallen, or lodged crop material yet deformable enough to contact the drive unit 220 without causing damage to the drive unit 220. In an alternative embodiment, the protuberances 214 may be composed of a substantially hard or rigid material which is not deformable, such as metal. Thereby, the drive unit 220 would have corresponding features, such as recesses, for accommodating and meshing with the hard protuberances 214. As shown in FIG. 2, by way of example only, a portion of the gathering wheel 210 is exposed such that approximately one-third of the gathering wheel 210 is located above the top surface of the hood 204. Hence, two-thirds of the gathering wheel 210 may be located and housed within the hood 204. It should be appreciated that the down crop gatherer 210 may be in the form of a wheel, gear, or any other desirable member which can move the crop material. The gathering wheel 210 may include numerous protuberances 214.

The drive unit 220 is rotatably mounted to the hood 204 and has a second rotational direction R2 (FIG. 2). The drive unit 220 is configured for respectively contacting the field G and the down crop gatherer 210 in order to drive the down crop gatherer 220 in its rotational direction R1. The drive unit 220 includes at least one shaft 222 and at least one drive wheel 224. The shaft 222 may be rotatably coupled to the hood 204 by mounting brackets, and the drive wheel 224 can be attached to the shaft 222 (FIG. 3). It should be appreciated that the drive wheel 224 may be in the form of a wheel, a gear, or any other desirable member which can contact the field G and drive the down crop gatherer 210.

In operation, as the header 204 moves in the forward direction F, the drive wheel 224 contacts the field G and thus rotates in the second rotational direction R2; thereby, the rotation of the drive wheel 224 causes the rotation of gathering wheel 210 in the opposite direction R1. For instance, as shown in FIG. 2, the drive wheel 224 may rotate in the clockwise direction R2, which in turn causes the gathering wheel 210 to rotate in the counter-clockwise direction R1. In this regard, down crop material can efficiently be moved, by the rotating gathering wheel 210, from the hoods 204 inwardly toward the rear of the header 200 and into the conveyor trough.

The gathering wheels 210 and/or the gatherer shafts 212 and the drive wheels 224 and/or the drive shafts 222 may each be removably coupled to the hoods 204. For example, the gathering wheel 210 may be snap-fitted or removably fastened to the gatherer shaft 212, and/or the gatherer shaft 212 may be snap-fitted or removably fastened the hood 204. Additionally, the drive shaft 222 may be snap-fitted or removably fastened to the hood 204, and/or the drive wheel 224 may be snap-fitted or removably fastened to the drive shaft 222. Each opening 206 may include a respective covering so that when the gathering wheel 210 is not connected to the hood 204 the opening 206 is completely covered. Thus, in operating conditions when down crop is not present, the header 200 may be operated without using its down crop gathering feature, and in operating conditions with down crop present, the header 200 may gather down crop material via the gathering wheel 210 and the drive unit 220. Therefore, the header 200 can increase the overall efficiency of the harvesting process because the down crop gatherer 210 and the drive unit 220 do not scavenge power from the combine 100, and the header 200 may be optimized to gather or not gather down crop depending upon specific operating conditions.

In an alternative embodiment, the header 200 may include multiple gathering wheels 210 positioned at various points along the hood 204. Thereby, the header 200 may also include multiple drive wheels 224 for driving the gathering wheels 210. For example, the header 200 may include a set of three gathering and drive wheels 210, 224 that are positioned in series along the center of the hood 204. Additionally, for example, the header 200 may have two or more sets of gathering and drive wheels 210, 224 that are posited laterally adjacent to one another from left to right across the hood 204. It should be appreciated that the hood 204 may have multiple openings 206 to accommodate the multiple gathering wheels 210 and/or the hood 204 may have one opening 206 to accommodate multiple gathering wheels 210. It is also conceivable for the header 200 to include one drive wheel 224 and multiple gathering wheels 210. Thereby, one drive wheel 224 would operably drive multiple gathering wheels 210 via a chain or belt that is operably interconnected in between two or more gathering wheels 210. The header 200 may also include one or more intermediary gear(s) or wheel(s), which transmit movement in between the drive wheel 224 and the gathering wheel 210. For instance, the hood 204 may house a series of intermediary wheels operably interconnected in between the drive wheel 224 and the gathering wheel 210.

In another exemplary embodiment according to the present invention, the header 200 may include a track system. Thereby, the drive wheels 224 of the header 200 may be replaced by one or more track(s) which contact the ground and provide additional driving force to the gathering wheels 210.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
   a chassis; and
   a header connected to the chassis and configured for traversing a field in a forward direction to harvest a crop material, said header including:
      a frame;
      at least one crop divider connected to the frame and having a crop divider body with at least one opening therein;
      at least one down crop gatherer rotatably mounted to said at least one crop divider and at least partially extending through said at least one opening of the crop divider body, said at least one down crop gatherer having a first rotational direction, and said at least one down crop gatherer being in the form of at least one gathering wheel; and
      a drive unit rotatably mounted to said at least one crop divider and contacting said at least one down crop gatherer, said drive unit having a second rotational direction and being configured for contacting the field and driving said at least one down crop gatherer in its first rotational direction.

2. The agricultural vehicle of claim 1, wherein the drive unit includes at least one shaft rotatably coupled to said at least one crop divider and at least one drive wheel connected to the shaft.

3. The agricultural vehicle of claim 2, wherein said at least one drive wheel respectively contacts the field and said at least one down crop gatherer as the header is moved in the forward direction such that said at least one drive wheel rotates in the second rotational direction and drives the down crop gatherer.

4. The agricultural vehicle of claim 3, wherein said at least one gathering wheel is driven by said at least one drive wheel.

5. The agricultural vehicle of claim 4, wherein said at least one gathering wheel includes a plurality of protuberances configured for contacting a down crop material.

6. The agricultural vehicle of claim 5, wherein said plurality of protuberances are in the form of a plurality of flaps extending outwardly from said at last one gathering wheel.

7. The agricultural vehicle of claim 5, wherein said plurality of protuberances are composed of at least one of a plastic material and a rubber material.

8. The agricultural vehicle of claim 1, wherein said header further includes a gatherer shaft configured for rotatably mounting said at least one down crop gatherer to said at least one crop divider.

9. The agricultural vehicle of claim 1, wherein said at least one down crop gatherer and said at least one drive unit rotate in opposite directions.

10. A header for an agricultural vehicle traversing a field in a forward direction to harvest a crop material, said header including:
    a frame;
    at least one crop divider connected to the frame and having a crop divider body with at least one opening therein;
    at least one down crop gatherer rotatably mounted to said at least one crop divider and at least partially extending through said at least one opening of the crop divider body, said at least one down crop gatherer having a first rotational direction, and said at least one down crop gatherer being in the form of at least one gathering wheel; and
    a drive unit rotatably mounted to said at least one crop divider and contacting said at least one down crop gatherer, said drive unit having a second rotational direction and being configured for contacting the field and driving said at least one down crop gatherer in its first rotational direction.

11. The header of claim 10, wherein the drive unit includes at least one shaft rotatably coupled to said at least one crop divider and at least one drive wheel connected to the shaft.

12. The header of claim 11, wherein said at least one drive wheel respectively contacts the field and said at least one down crop gatherer as the header is moved in the forward direction such that said at least one drive wheel rotates in the second rotational direction and drives the down crop gatherer.

13. The header of claim 12, wherein said at least one gathering wheel is driven by said at least one drive wheel.

14. The header of claim 13, wherein said at least one gathering wheel includes a plurality of protuberances configured for contacting a down crop material.

15. The header of claim 14, wherein said plurality of protuberances are in the form of a plurality of flaps extending outwardly from said at last one gathering wheel.

16. The header of claim 14, wherein said plurality of protuberances are composed of at least one of a plastic material and a rubber material.

17. The header of claim 10, wherein said header further includes a gatherer shaft configured for rotatably mounting said at least one down crop gatherer to said at least one crop divider.

18. The header of claim 10, wherein said at least one down crop gatherer and said at least one drive unit rotate in opposite directions.

19. A method for operating an agricultural vehicle, comprising the steps of:
    providing a header for traversing a field, said header including a frame, at least one crop divider connected to the frame and having a crop divider body with at least one opening therein, at least one down crop gatherer rotatably mounted to said at least one crop divider and at least partially extending through said at least one opening of the crop divider body, said at least one down crop gatherer having a first rotational direction, and said at least one down crop gatherer being in the form of at least one gathering wheel, and a drive unit rotatably mounted to said at least one crop divider and contacting said at least one down crop gatherer, said drive unit having a second rotational direction and being configured for contacting the field and driving said at least one down crop gatherer in its first rotational direction;
    rotating the drive unit in the second rotational direction by moving the header in a forward direction;
    driving said at least one down crop gatherer by translating a rotational movement of the drive unit to rotate said at least one down crop gatherer in the first rotational direction; and
    gathering a down crop material from said at least one crop divider toward a rear of the header by said down crop gatherer.

20. The method of claim 19, wherein the drive unit includes at least one shaft rotatably coupled to said at least one crop divider and at least one drive wheel connected to the shaft, and said at least one gathering wheel contacts said at least one drive wheel.

* * * * *